United States Patent [19]

Nauck

[11] Patent Number: 5,014,936
[45] Date of Patent: * May 14, 1991

[54] SATELLITE SYSTEM HAVING VARIABLE CONFIGURATION

[75] Inventor: Joachim Nauck, Bremen, Fed. Rep. of Germany

[73] Assignee: Erno Raumfahrttechnik GmbH, Bremen, Fed. Rep. of Germany

[*] Notice: The portion of the term of this patent subsequent to May 27, 2003 has been disclaimed.

[21] Appl. No.: 874,810

[22] Filed: Jun. 13, 1986

Related U.S. Application Data

[63] Continuation of Ser. No. 643,679, Aug. 24, 1984, abandoned.

[30] Foreign Application Priority Data

Sep. 3, 1983 [EP] European Pat. Off. ........ 83108702.8

[51] Int. Cl.[5] .............................................. B64G 1/44
[52] U.S. Cl. .................................. 244/158 R; 244/159; 244/173
[58] Field of Search .................... 244/158 R, 173, 159, 244/161

[56] References Cited

U.S. PATENT DOCUMENTS

| 3,520,496 | 7/1970 | Wuenscher ........................ 244/159 |
| 3,863,870 | 2/1975 | Andrews et al. .................. 244/173 |
| 4,305,555 | 12/1981 | Davis ................................ 244/173 |
| 4,374,579 | 2/1983 | Renner et al. ................... 244/158 R |
| 4,375,878 | 3/1983 | Harvey et al. ................... 244/158 R |
| 4,384,692 | 5/1983 | Preukschat ....................... 244/158 R |
| 4,591,116 | 5/1986 | Guenther et al. ................ 244/173 |

OTHER PUBLICATIONS

John Edward Keigler, High Power Altitude Satellite System, Dec. 11, 1981.

Primary Examiner—Margaret A. Focarino
Assistant Examiner—James M. Kannofsky
Attorney, Agent, or Firm—Ralf H. Siegemund

[57] ABSTRACT

A satellite system is basically composed of a service module and a payload module interconnected to permit relative rotation of the latter in relation to the former so that the service module remains oriented with its solar generators facing the sun while the payload module may remain oriented towards the earth. Additional payload modules can be connected to the service module or to a payload module, and additional service modules can be connected to the first mentioned service module. The coupling is provided in each instance through a BAPTA interface.

2 Claims, 3 Drawing Sheets

SATELLITE SYSTEM HAVING VARIABLE CONFIGURATION

This is a continuation of application Ser. No. 643,679, filed Aug. 24, 1984, now abandoned.

BACKGROUND OF THE INVENTION

The present invention relates to a satellite system being comprised of at least two interconnected bodies or modules respectively constituting power supply and service module, and payload modules.

Satellites or satellites systems orbiting the earth are usually oriented in relation to the sun. Their position or attitude is, for example, determined on the basis of spin moments or, if such an effect is undesirable, orientation is provided through follower control with respect to certain reference aspects. Known satellite systems may, for example, be comprised of two bodies which are rotatable in relation to each other, and one rotates for purposes of attitude stabilization with respect to the other one; the latter remaining stationary as far as that rotation is concerned accordingly. The latter body moreover will constitute the basic component. During operation it is necessary to maintain the satellite in a relatively stable and uniform orientation vis-a-vis space. This orientation is usually maintained under utilization of the spin effect, i.e., the satellite or a portion thereof (momentum wheel) rotates continuously about a fixed axis. Utilization of this effect is further enhanced if one provides a non-rotating payload platform or the like, whose orientation is maintained vis-a-vis the earth, and serving primarily as payload device.

In accordance with another aspect, it is known to stabilize a satellite vis-a-vis three axes, each of them are oriented vis-a-vis a reference point. Appropriate sensors provide follow-up control, and a suitable torque control devices maintain dynamically and actively the desired attitude and orientation. This kind of approach is usually used if the spinning proves to have too many undesirable side effects.

Turning back to a basic satellite system composed of two modules, one has to consider that in fact two different planes of orientation are needed. The service module is oriented basically vis-a-vis the sun as a primary source of energy. On the other hand, the payload is oriented usually towards the earth for reasons of communication, observational features, etc. (see e.g. U.S. Pat. No. 4,374,579). One can see, however, that the service module is the immediate source of energy for the equipment in the satellite and is primary as far as various motions is concerned. For example, the solar generator of the service module has to track faithfully the sun while the orientation of the payload towards the earth should remain independent from this solar tracking. This then has led to the point that permanent connections are provided between the payload module and the service module, and the arrangement of the two must follow particular sequence.

DESCRIPTION OF THE INVENTION

It is an object of the present invention to provide a new and improved satellite system of the modular construction permitting basically an exchange of modules without affecting the rest of the system.

It is another object of the present invention to interconnect a payload module to the remainder of the system such that independently from any movements of the service module the payload module will in accordance with a sensor be continuously oriented towards the earth.

In accordance with the preferred embodiment of the present invention, it is suggested to provide a payload module and a service module, whereby the payload module includes attitude and orientation control means to maintain a particular orientation of the module vis-a-vis the earth, and the service module is to be provided with means for maintaining an orientation vis-a-vis the sun and a second reference point, for example, the North Star, and that a plane of separation is provided between the service module and the payload module, which includes a coupling structure being one of several coupling structures of the service module to obtain a releasable connection between the two modules. Moreover, it is suggested that a particular surface of the service module is provided as solar generator surface, and those surfaces of the service module which are not irradiated with solar radiation are provided with these plural coupling structures for connecting thereto one or more payload modules and/or additional service modules. Alternatively, the same area which includes the solar generator surface could be provided with coupling structures for connecting additional solar generator panels thereto. The inventive system permits the combination of larger units in that, for example, several service modules are interconnected, and each of them includes and is connected to one or even several payload modules.

The coupling, i.e., the interface plane between a service module and a payload module, may include socalled bearing and power transfer assembly (BAPTA) having its basic function to transfer of energy from the surface module to the respective payload module. Decisive for a coupling structure referred to above is that each of the payload module is independently rotatable vis-a-vis the service module.

It can thus be seen that the invention proposes a basic satellite system which includes at least two modules, one of them being a service module to provide the requisite energy, the other one being a payload module. The service module is an independent unit, and is provided with solar generators occupying at least a certain area of the module. This surface is always oriented to face the sun, so that other surfaces of the service module are either exposed to a smaller amount of solar energy, or even face away from the sun, which means that all surfaces other than the one facing directly the sun can be provided for coupling to one or more payload modules and/or service modules.

As stated, the generator surface of the service module may be supplemented through another generator extending from both sides to increase the amount of captured solar energy. It was found practical to provide the construction in the following manner. The surface proper of the surface module facing the sun is used to generate the energy needed for running the surface module itself. The panels supplementing the solar energy capturing capability of the system are then used as supply for the payload.

The satellite system as such is constructed on a unit module basis. A particular unit type module is a service module, and another unit module is the payload module. Selectively one can interconnect several service modules with several payload modules and combine them into a common system. The service module is stabilized along three axes. It is stabilized through tracking the sun and supplementary attitude control homed in on the North Star. As stated, the main reference point is the sun, and a secondary reference being, for example, the North Star can be regarded, particularly on a fairly long term basis, as a fixed point in space.

The payload module or modules are capable of rotating vis-a-vis the service module so that they can orient themselves in a relation to the earth. In particular, the service module has, as stated, one of its particular surfaces constantly oriented to face the sun, which means that a service module retains a solar oriented attitude throughout orbiting. The payload module on the other hand rotates vis-a-vis the service module and retains its attitude vis-a-vis the earth. Thus, the entire system is oriented vis-a-vis the sun, and the payload module is continuously reoriented towards Earth.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

Figure 1:
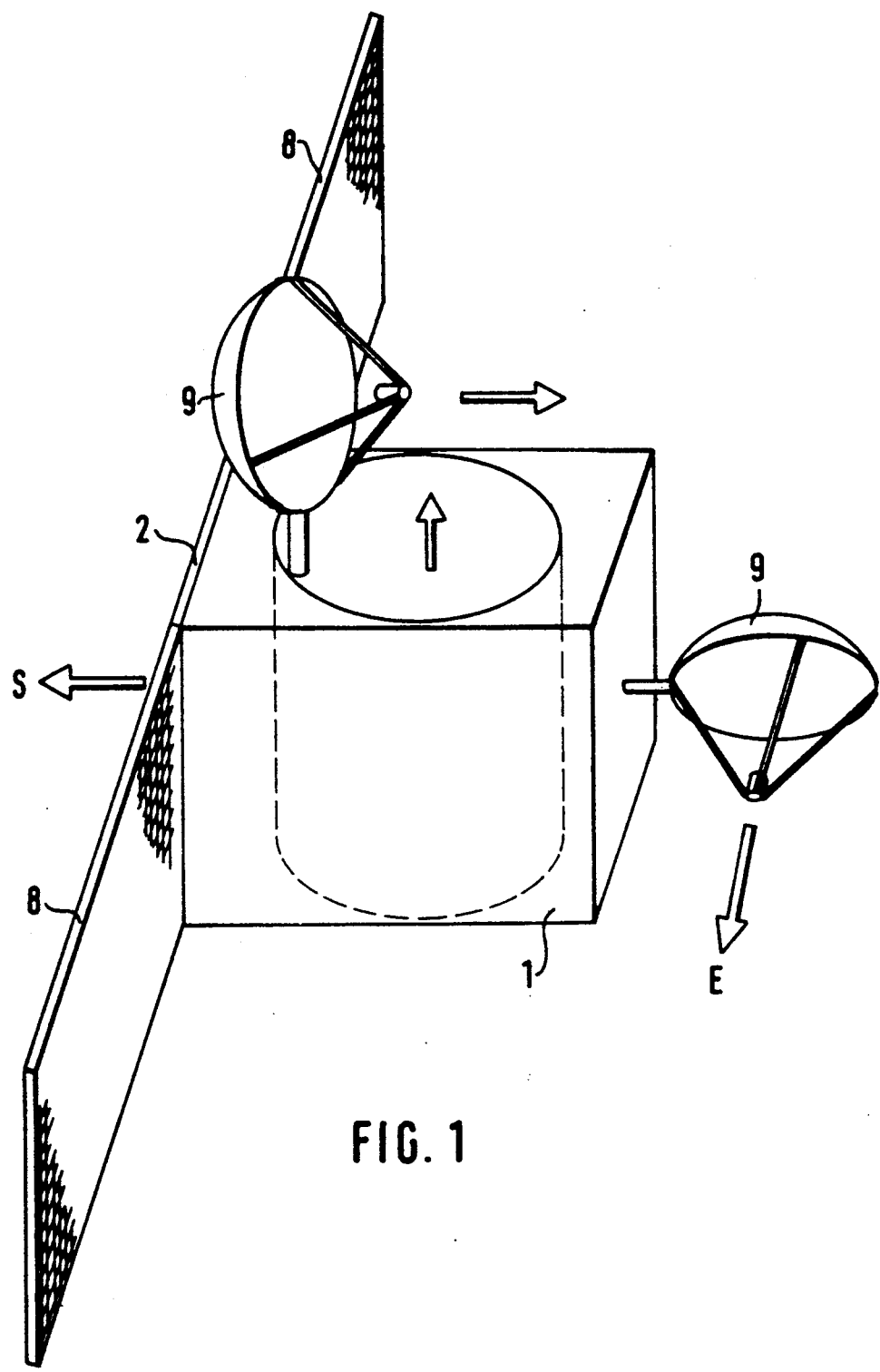
FIG. 1 is a somewhat schematic view of a service module to which are connected several payload modules in accordance with the preferred embodiment of the present invention.
Figure 2:
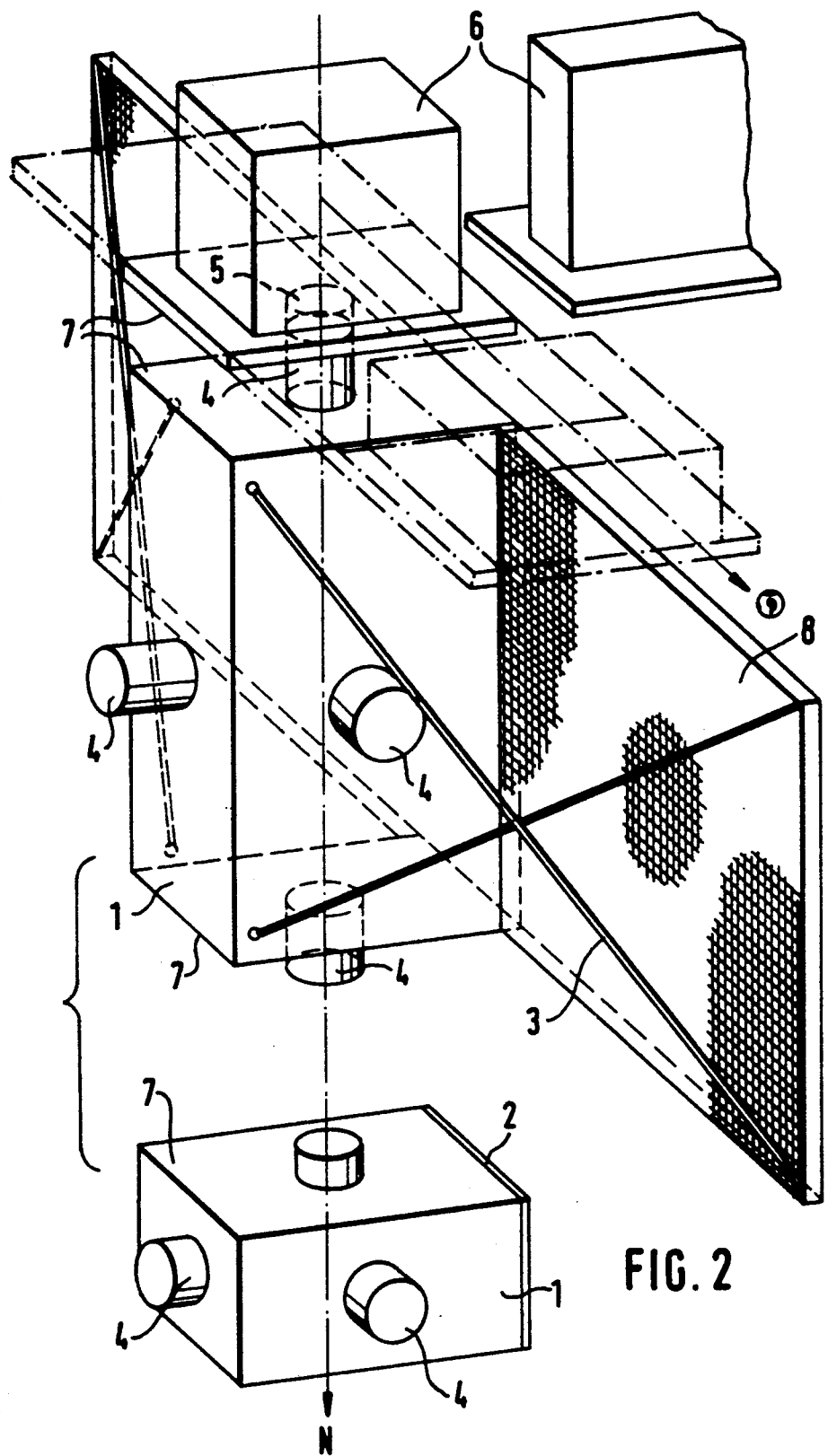
FIG. 2 is an exploded View of the satellite system shown in FIG. 1 with emphasis on the interface and coupling between surface module and payload modules.
Figure 3:
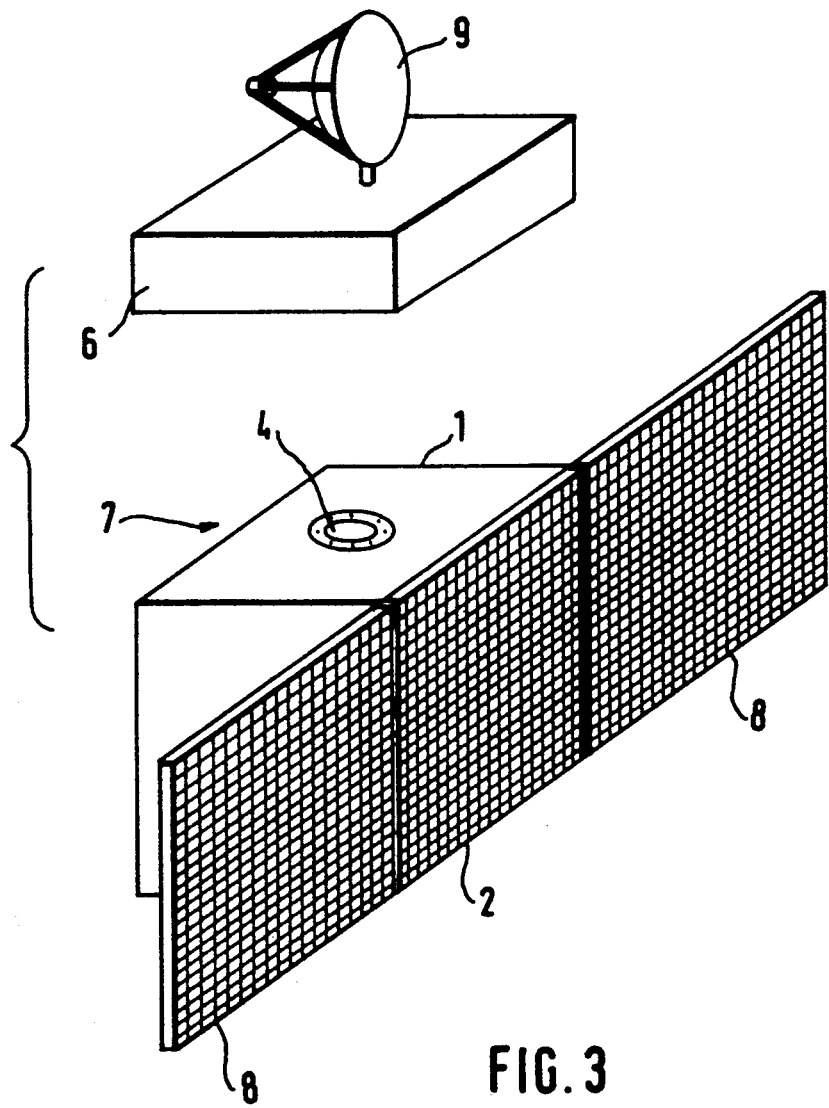
FIG. 3 is another view of the service module shown in FIG. 1, but illustrating it from the side showing surfaces facing the sun for capturing solar radiation.

Proceeding now to the detailed description of the drawing, the figures illustrate a service module 1 being basically the energy and power supply source for the satellite system as a whole, and including a particular surface 2 equipped with solar generators to being directly a part of the service module body. In addition, solar panels 8 are attached to the main body of the service module and, so to speak, are lateral extensions of the solar generators 2. These panels 8 are attached edge-on with one side respectively of the service module 1 being a side not facing the sun. In addition, as shown in FIG. 2, cables are provided to tension the panels in a crosswise pattern. The cables are particularly provided for interconnecting corner points of the panels and sides of the surface module at points remote from the area of attachment of the respective panel to the service module. All of these aspects#are readily discernible from FIG. 2 (for details see Ser. No. 634,418 filed July 25, 1984 by me and others). This way, and particularly because of the crosswise tensioning, one obtains a maximum possible lever arm as between the extremities of the solar panel and the body of the service module so as to tension and possibly deflect the panels. The cables may be shortened through winches, not shown, to obtain a maximum orientation of the solar panels and of the solar generators as a whole vis-a-vis the sun. Sensors are provided in order to make sure that in fact the solar generators are uniformly affected by the pressure of the solar wind, whereby any imbalance of the tensioning provides for a torque acting upon the surface module on account of an imbalance in the -solar wind and through varying the tension on the cable and deflecting them the panels may obtain a reorientation of the satellite as a whole vis-a-vis the sun as only a directly facing attitude will produce uniform solar wind pressure upon the vehicle.

Having established that in fact the service module is caused to orientate itself automatically vis-a-vis the sun under consideration of the effective solar pressure, I now turn to the payload modules. The surface portions, or at least one surface of the service module not facing the sun, is (are) provided with releasably and rotatably connecting payload modules to the service module. The particular geometry selected and the structure illustrated establishes readily facilities for altogether five coupling structures 4 so that five payload modules can be connected to the service module (or the payload module can be connected in five different positions).

The service module of course provides the electrical energy for all of the payload modules connected to it. Each of the payload modules is provided with a sensor which through a servo system causes the payload module to rotate in relation to the service module by operation of the respective coupling structure 4 to maintain a particular orientation vis-a-vis the earth. The drive for such rotation could be provided in the service module, receiving of course its energy from the solar energy capturing facilities, or the drive could be part of the respective payload module. In this case, power has to be supplied through the coupling structure 4 from the service module.

The particular unit module or model module unit type of construction is readily discernible from FIG. 2, showing particularly that any number of service modules up to five can be coupled to the service module, which of course means that not the full number has to be used in all instances if the number is less than five, a limited choice in the particular location of attachment can be made. The coupling structures 4 are provided so that they cannot only accommodate several payload modules but additional service modules can be attached. One can see here, for example, that service modules can be interconnected in alignment as far as the panels are concerned, and they can be stacked in this fashion all facing the sun while each of these service modules may then carry several payload modules.

The interface plane 7 between surface module and payload module is not just used for coupling or disconnecting such modules, but these interfaces are provided to maintain independence of the modules so that any one module does not interfere with any of the other modules, and each of them can therefore orient itself on the basis of particular parameters. This then is the specific advantage of the invention, namely to make it possible to provide all kinds of presently known missions, along polar solar orbits, synchronous orbits, or geostationary orbits. These tasks can be carried out with the same kind of service module because a service module once placed in orbit is attitude controlled, and in a time independent fashion can assume, and cooperate with any appropriate payload modules. This versatility was not possible prior to this invention.

The invention is not limited to the embodiments described above, but all changes and modifications thereof not constituting departures from the spirit and scope of the invention are intended to be included.

I claim:

1. Satellite system including at least one service module provided for power supply and at least one payload module comprising:

said service module being provided with solar panels extending laterally from opposite surfaces of said module and coplanar with a particular surface of the service module, the particular surface being likewise constructed as solar panel;

cable means for tensioning the panels individually and including means for distorting them to thereby change their effective surface;

means for orienting the particular surface of the service module towards end in relation to the sun during orbiting including means for operating the cable; and coupling means for releasably connecting the payload module to the service module and permitting relative motion to the payload module in relation to the service module such that the payload module can be oriented towards the earth and independently from the orientation of the service module on its orbiting path.

2. Satellite system as in claim 1 wherein each panel is tensioned by two cables of the cable means, extending from corner points of the panel towards the service module in crossing relation.

* * * * *